(12) United States Patent
Monte

(10) Patent No.: US 7,086,520 B2
(45) Date of Patent: Aug. 8, 2006

(54) DEVICE FOR CONVEYING AND ARRANGING CYLINDRICAL ELEMENTS, SUCH AS BOTTLES, IN A ROW

(75) Inventor: Giuseppe Monte, Bologna (IT)

(73) Assignee: Marchesini Group S.p.A., Bologna (IT)

( * ) Notice: Subject to any disclaimer, the term of this patent is extended or adjusted under 35 U.S.C. 154(b) by 0 days.

(21) Appl. No.: 11/248,446

(22) Filed: Oct. 11, 2005

(65) Prior Publication Data

US 2006/0081442 A1 Apr. 20, 2006

(30) Foreign Application Priority Data

Oct. 14, 2004 (IT) .......................... BO2004A 0631

(51) Int. Cl.
*B65G 43/00* (2006.01)
(52) U.S. Cl. .................. 198/444; 198/453; 198/455
(58) Field of Classification Search ................ 198/444, 198/453, 455
See application file for complete search history.

(56) References Cited

U.S. PATENT DOCUMENTS

| | | | |
|---|---|---|---|
| 2,047,106 A * | 7/1936 | Lidberg et al. ............. | 198/455 |
| 2,389,496 A | 11/1945 | Gagnon et al. | |
| 3,601,240 A * | 8/1971 | Dominici ................... | 198/382 |
| 3,710,919 A | 1/1973 | Maters | |
| 4,054,201 A * | 10/1977 | Rollinger .................. | 198/455 |
| 4,252,232 A | 2/1981 | Beck et al. | |
| 5,170,879 A | 12/1992 | Smith | |
| 5,782,332 A * | 7/1998 | Guidetti et al. ............. | 198/357 |

FOREIGN PATENT DOCUMENTS

| FR | 2665424 A1 | 2/1992 |
|---|---|---|
| GB | 2302855 A | 2/1997 |

* cited by examiner

*Primary Examiner*—Joe Dillon, Jr.
(74) *Attorney, Agent, or Firm*—William J. Sapone; Coleman Sudol Sapone P.C.

(57) ABSTRACT

A device for transporting and arranging cylindrical elements in a row has a first conveying belt, operated by first motor means to pull a plurality of cylindrical elements in a feeding direction. A second conveying belt is situated in cascade with respect to the first conveying belt and is operated continuously for receiving and transporting the plurality of cylindrical elements in a direction concordant with the feeding direction. Canalization means are fastened to an upper run of the second conveying belt for intercepting and for guiding the cylindrical elements, being transported on the second conveying belt, in a discharge direction up to an outlet channel, situated on one side thereof. Sensor means are connected with the first motor means and detect the presence of at least one cylindrical element in a selected section of the second conveying belt. The sensor means deactivate the first motor means, after a first time interval, subsequent to detection, and activate them, after a second time interval, when no cylindrical elements are detected in the selected section.

6 Claims, 4 Drawing Sheets

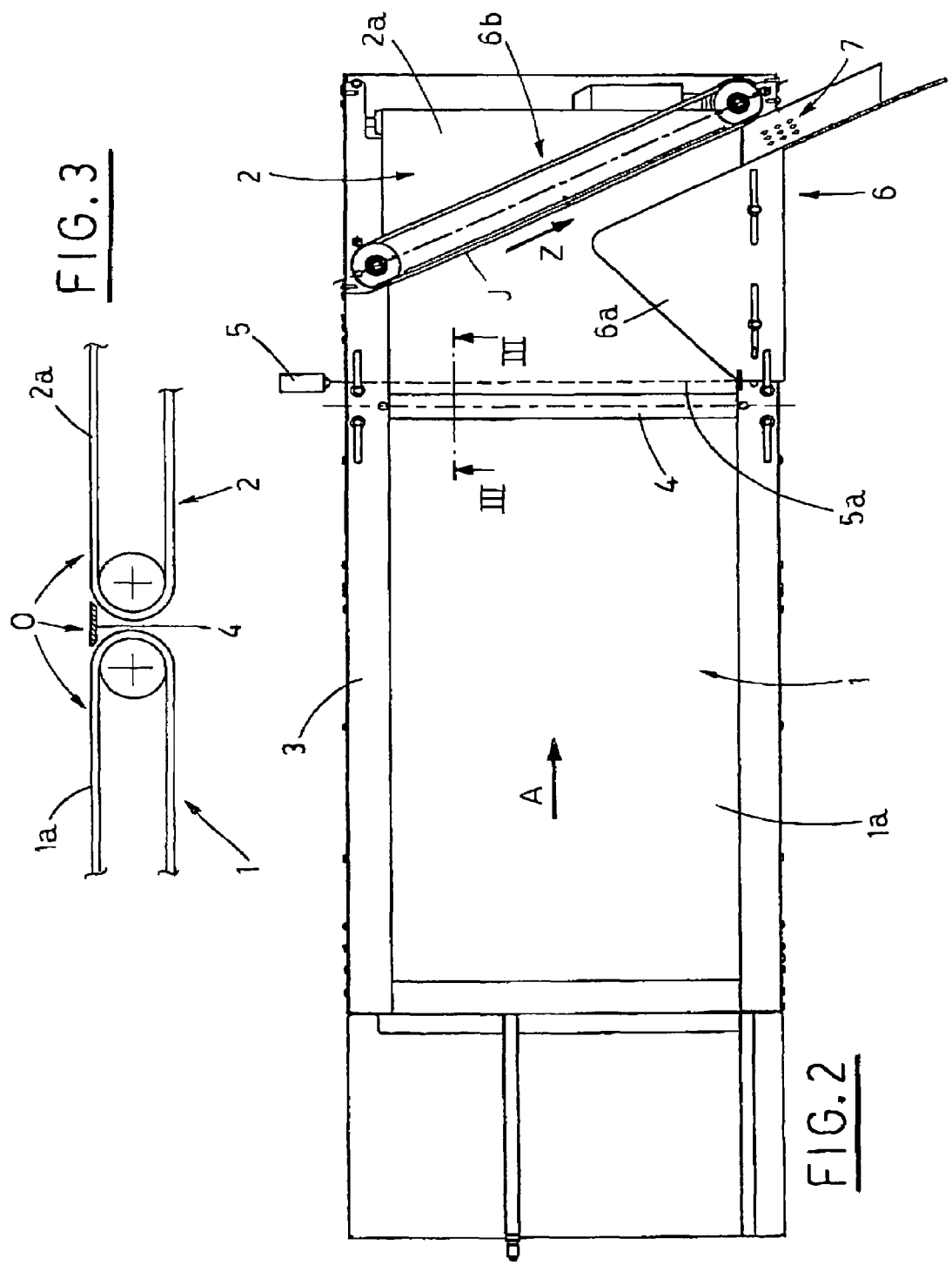

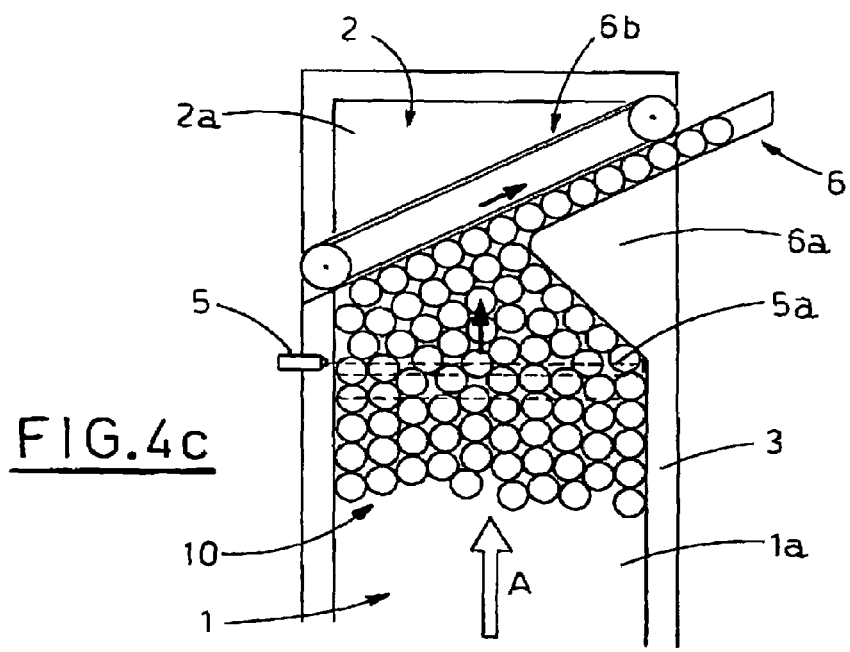
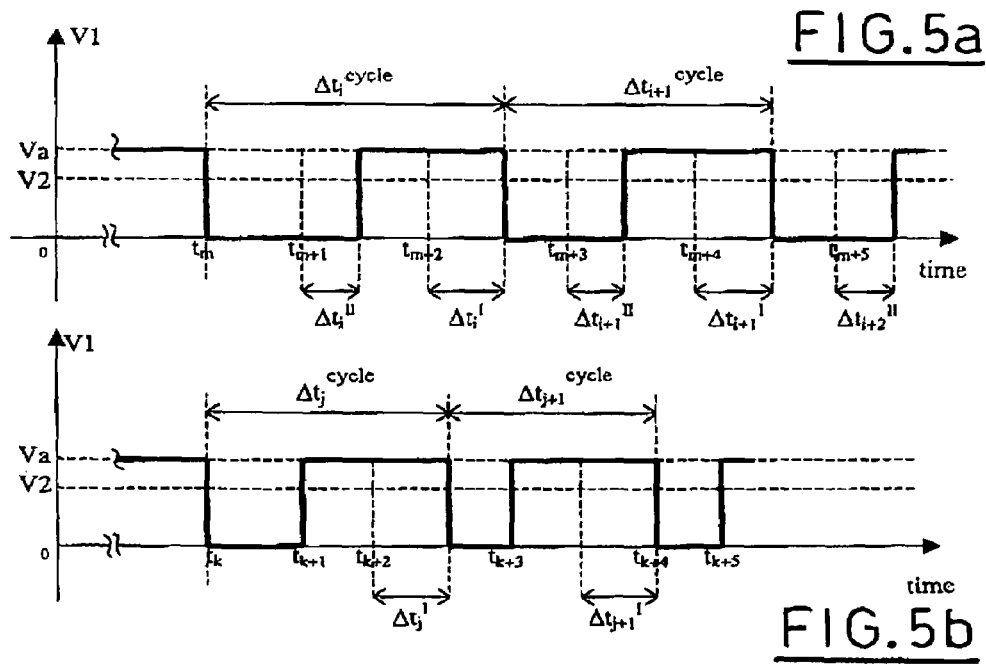

DEVICE FOR CONVEYING AND ARRANGING CYLINDRICAL ELEMENTS, SUCH AS BOTTLES, IN A ROW

FIELD OF THE INVENTION

The present invention relates to means for transporting and canalizing, in particular in one row, cylindrical elements, such as bottles and the like.

BACKGROUND OF THE INVENTION

There are many applications, including different technical fields, which require the transport of cylindrical elements, full or empty, and their arrangement in a row, in order to perform a following processing step, e.g. filling the empty bottles and their subsequent closing.

Known apparatuses include a first conveying belt, which pulls a plurality of bottles, placed on the corresponding upper run, from the inlet station toward the outlet station, near which canalization means canalize the bottles and arrange them in a row.

With reference to FIG. 1, one of the known embodiments of the canalization means includes a first stationary abutment F1 and a second stationary abutment F2, having corresponding opposite areas, and a second conveying belt M, which has a run J, operated in a direction Z, acting as abutment and guide for the bottles, as it defines a plane perpendicular to the one, in which the upper run S of the first conveying belt is situated.

The first and second stationary abutments F1, F2 and the second conveying belt M are fastened to the structure of the first conveyor H and stand above corresponding portions of the upper run S of the latter.

The operating of the upper run S of the first conveyor H, with the run being delimited at the sides by corresponding longitudinal edges Pa, Pb, causes pulling of the bottles put thereon in the feeding direction A.

The pulled bottles gather near the canalization means and they are guided there, due to the cooperation between the first and the second stationary abutments F1, F2 and of the second conveying belt M, in an outlet channel U, situated beside the upper run S.

However, the above described solution has disadvantages, since gathering of the bottles near the outlet section of the first conveyor H can create the so-called "bridges", that is stable blocks formed by a variable number of bottles; precisely, the mutual interaction among the latter and the interaction with the external forces, applied thereto, determine exactly a kind of bridge, interposed between the first and second stationary abutments F1, F2, so that a space without bottles is formed downstream of the jam while more bottles are further gathered upstream of the jam.

For example, this disadvantage, which depends on many factors, such as the material, from which the bottles are made, the bottles temperature, if they are of glass, and the geometrical dimensions, requires the interruption of the production and the manual intervention of an operator, with consequent waste of time and manpower for the constant control of the device.

A possible solution can be the use of agitating means, e.g. integrated in the stationary abutment element, which vibrate and oscillate with respect to a fixed position, which make unstable the bridges, created each time and thus disaggregate them.

On the other hand, the disaggregating causes sometimes, the fall of at least one bottle, forming the bridge, into the empty space defined downstream.

This stops the production and requires an operator's manual intervention, which makes this solution inefficient, at least partially.

SUMMARY OF THE INVENTION

The object of the present invention is to propose a device for transporting and arranging in a row cylindrical elements, in particular bottles, which is capable of working in a completely autonomous way, without any manual intervention, thus resolving the above described disadvantages.

A further object of the present invention is to propose a device for transporting and arranging in a row cylindrical elements, in particular bottles, whose structure and assembling are simple and relatively cheap.

The above mentioned objects are obtained, in accordance with the contents of the claims, by a device for transporting and arranging cylindrical elements, such as bottles, in a row, including:

a first conveying belt, operated in a feeding direction by first motor means to pull a plurality of cylindrical elements disposed on an upper run of said first conveying belt, up to a corresponding outlet section;

a second conveying belt, situated in cascade with respect to the first conveying belt, with interposition of a spline, for restoring the continuity between the upper runs of said first conveying belt and second conveying belt, said second conveying belt being operated continuously and receiving said plurality of cylindrical elements from the outlet section of said first conveying belt for transporting said cylindrical elements in a direction, concordant with the feeding direction, on an upper run of said second conveying belt;

canalization means, fastened to the upper run of said second conveying belt for intercepting said cylindrical elements being transported on said second conveying belt and for guiding them, in a row and in a discharge direction, from an intermediate section of the second conveying belt to an outlet channel, situated on one side;

sensor means, connected to said first motor means for detecting the presence of at least one of said cylindrical elements in a prefixed section of said second conveying belt, as well as for deactivating said first motor means, after a first time interval, subsequent to said cylindrical element being detected, and for activating said first motor means, after a second time interval, when no cylindrical elements are detected in said section.

BRIEF DESCRIPTION OF THE DRAWINGS

The characteristic features of the invention will be pointed out in the following, in accordance with the claims and with reference to the enclosed figures, in which:

FIG. 1 is a top view of the described, known device for transporting and arranging in a row cylindrical elements, such as bottles and the like;

FIG. 2 is a top view of the device proposed by the present invention;

FIG. 3 is a section view of a particular taken along the III—III of FIG. 2;

FIGS. 4a, 4b, 4c are top views of one particular of the proposed device, according to different processing steps;

FIGS. 5a, 5b are charts, showing the speed progresses in a prefixed time interval, respectively according to different cases of operation of the proposed device working.

DISCLOSURE OF THE PREFERRED EMBODIMENT

Figure 1:
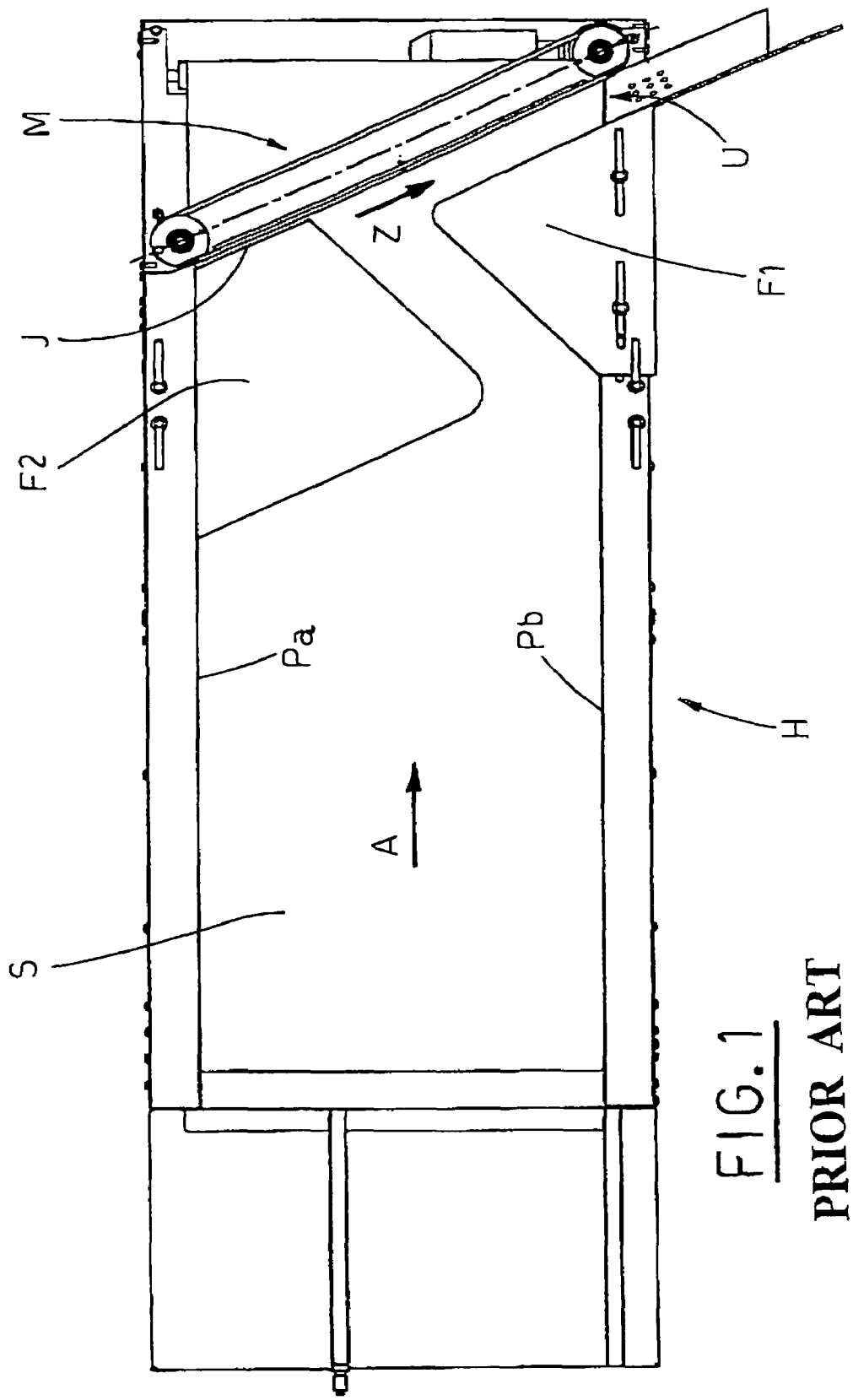

Having regards to the enclosed Figures, the reference numeral 3 indicates generally a stationary framework, which supports a first conveying belt 1 and a second conveying belt 2.

A spline 4, transversally interposed between the two conveyors and fastened to the framework 3, stabilizes the continuity of the upper runs 1a, 2a of the first conveying belt 1 and second conveying belt 2, respectively, and lies on the horizontal plane O defined by the runs 1a, 2a.

The first conveying belt 1 is operated as a consequence of the operation of first motor means, not shown, aimed at operating the relative upper run 1a in a feeding direction A, while the second conveying belt 2 is operated continuously (e.g. at constant speed), in a direction concordant with the feeding direction A, by the activation of second motor means, likewise not shown in Figures.

The reference numeral 5 indicates sensor means, e.g. optical, situated on one side of the upper run 2a and acting on their section 5a, e.g. transversal, situated near the inlet section, in order to detect the passage, or even only the presence, or at least one cylindrical element, through this section, and to activate the first motor means, in a way better described later on.

Canalization means 6 are fastened to the framework 3 and situated above the upper run 2a of the second conveying belt 2: they include a stationary abutment 6a and a third conveying belt 6b, both situated above corresponding portions of the upper run 2a, with the horizontal plane O, defined by the latter, being perpendicular to the symmetry plane of the third conveying belt 6b, see FIG. 2.

The third conveying belt 6b has a run J facing the stationary abutment 6a and is operated continuously by third motor means, not shown, to cause motion of the run J in a discharge direction Z.

The free space, which is defined between the stationary abutment 6a and the third conveying belt 6b, delineates, beside the upper run 2a, a corresponding outlet channel 7.

Figure 4B:
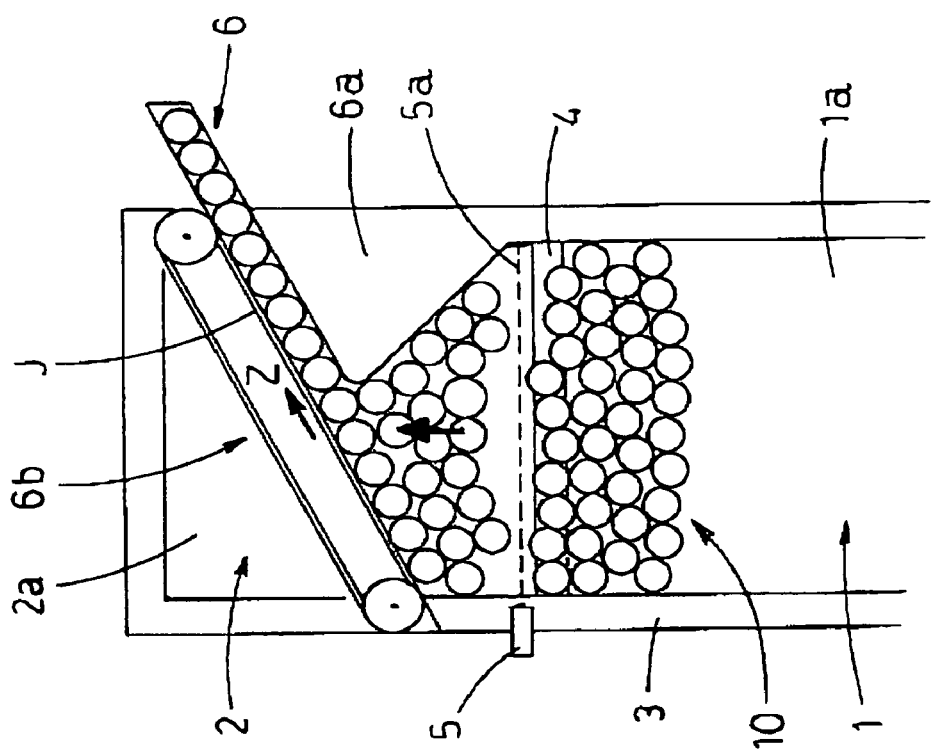
Figure 4A:
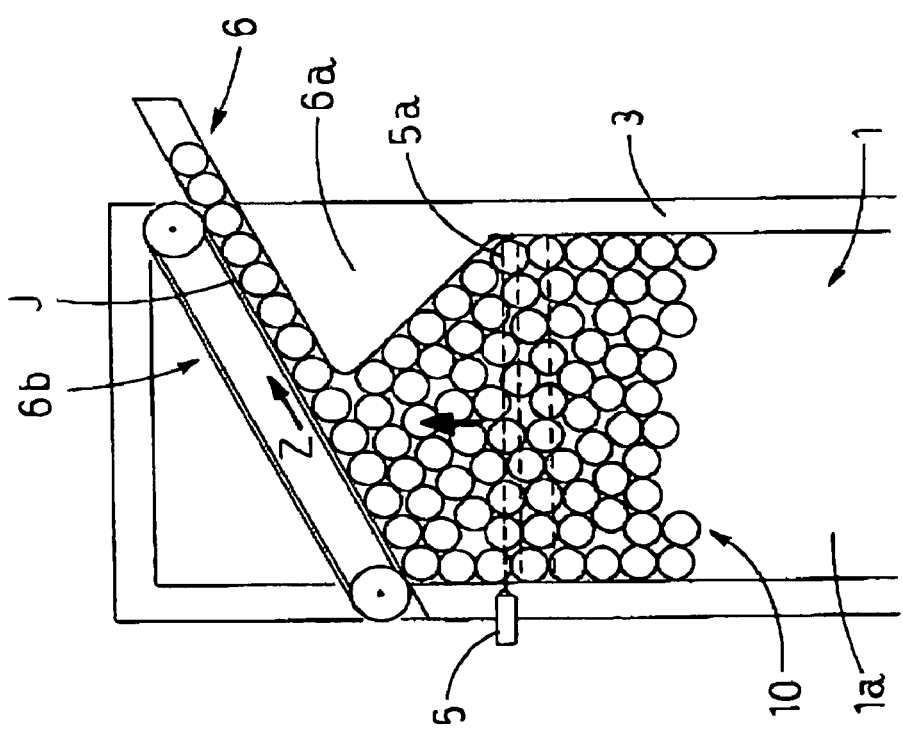

Finally, FIGS. 4a, 4b, 4c indicate a plurality 10 of cylindrical elements, e.g. bottles, lying on the upper runs of the first conveying belt 1 and the second conveying belt 2.

The operation of the device proposed by the present invention will be described now.

The plurality 10 of bottles is pulled in a feeding direction A, from the inlet section of the first conveying belt 1, to the canalization means 6, where they are guided (in the discharge direction Z) through the outlet channel 7, with the bottles 10 arranged in a row.

As it has already been pointed out, the second conveying belt 2 and the third conveying belt 6b are operated continuously by second and third motor means, while the first conveying belt 1 is operated by first motor means, which are connected to the sensor means 5, in a way described later, with reference to FIGS. 4a, 4b, 4c and to the charts 5a, 5b.

The chart of FIG. 5a shows the ideal progress, thus without considering any transient, of the speed V1, assumed by the upper run 1a of the first conveying belt 1 with respect to the time, referring to two general consecutive working cycles, i-nth and i-nth plus one, having e.g. different duration, $\Delta t_i^{cycle}$ and $\Delta t_{i+1}^{cycle}$.

The chart shows also, indicated with broken line, the speed V2 of the upper run 2a of the second conveying belt 2, which can be reached by the upper run 1a of the first conveying belt 1. The speed V2 is kept constant, e.g. lower than the speed Va.

FIG. 4 shows a plurality of bottles 10 gathered upstream of the canalization means 6, with the upper run 1a of the first conveying belt 1 being motionless.

This situation occurs after the general time $t_m$, which corresponds to the deactivation of the first motor means and the beginning of the i-nth cycle, as shown in FIG. 5a.

Thus, the bottles 10, lying on the upper run 2a and transported in the feeding direction A, free the area corresponding to the inlet section of the second conveying belt 2, until, time $t_{m+1}$, the sensor means 5 detect no bottle in the selected section 5a; at this point, see FIG. 4b, and after a prefixed delay equal to a second time interval $\Delta t_i^{II}$, the first motor means are activated and the upper run 1a moves with the speed Va, after a transient ideally zero.

This value of speed Va is kept by the upper run 1a also when at least one bottle is detected in the selected section 5a, time $t_{m+2}$, and for a prefixed time interval, subsequent to the detection, first time interval $\Delta t_i^I$, to allow a suitable gathering of bottles 10 near the canalization means 6, see FIG. 4c.

When the first time interval $\Delta t_i^I$ is finished, the first motor means are deactivated (V1=0) and a new cycle begins, subsequent to the previous one, the i-nth plus one cycle, with the processing steps performed in the same way as the ones described in the previous cycle.

According to a possible embodiment, the second time interval $\Delta t_i^{II}$ can be removed from the general n-th cycle; in this case, the reference chart to be taken into consideration for representation of the speed V1 assumed by the upper run 1a in function of time, will be the one of FIG. 5b.

The above embodiment takes into consideration two general and subsequent working cycles, j-nth cycle and j-nth plus one cycle, having the duration $\Delta t_j^{cycle}$ and $\Delta t_{j+1}^{cycle}$; the speed V2 of the upper run 2a of second conveying belt 2 is also shown, indicated with broken line, constant and lower than the speed Va, which can be reached by the upper run 1a of the first conveying belt 1.

The situation shown in FIG. 4 is subsequent to the general time $t_k$, corresponding to the deactivation of the first motor means and the beginning of the j-nth cycle, as shown in FIG. 5b.

Thus, the bottles 10, lying on the upper run 2a and transported in the feeding direction A, free the area corresponding to the inlet section of the second conveying belt 2, until, time $t_{k+1}$, the sensor means detect no bottle in the section 5a, (FIG. 4b); at this point, the first motor means are activated and the upper run 1a assumes the speed Va, with the transient ideally zero.

This speed value is kept by the upper run 1a also when at least one bottle is detected in the 5a, time $t_{k+2}$, and for a prefixed time interval subsequent to the detection, first time interval $\Delta t_j^1$, so as to allow bottles 10 to amass suitably upstream of the canalization means 6, see FIG. 4c.

When the first time interval $\Delta t_j^1$ has terminated, the first motor means are deactivated (V1=0) and a new cycle begins, subsequent to the previous one, the j-nth plus one cycle, with the processing steps performed in the same way as the ones described in the previous cycle.

The above mentioned fixed time intervals, first and second, as well as the positioning of the section 5a, are chosen in such a way, as to assure a best operation of the device proposed by the present invention, which thus works in a wholly automatic way, without an operator's intervention.

Actually, gathering of bottles near the canalization means 6 during each working cycle, never reaches an entity, which could cause the formation of a bridge.

By the light of the above considerations, the present device avoids the disadvantages of the known solutions, recalled in the introduction.

Moreover, the present device is simple to assemble and relatively cheap.

It is understood that what above has been described as a mere, not limiting example. Therefore, it is obvious that any practical-use changes applied thereto remain within the protective scope of the invention as described above and claimed below.

What is claimed is:

1. A device for transporting and arranging cylindrical elements, in a row, including:

a first conveying belt, operated in a feeding direction by first motor means to pull a plurality of cylindrical elements disposed on an upper run of said first conveying belt, up to a corresponding outlet section of said first conveying belt a second conveying belt, having an upper run, downstream of and colinear with the first conveying belt, with interposition of a spline, for restoring the continuity between the upper runs of said first conveying belt and second conveying belt, said second conveying belt being operated continuously and receiving said plurality of cylindrical elements from the outlet section of said first conveying belt for transporting said cylindrical elements in the feeding direction, on an upper run of said second conveying belt;

canalization means, fastened at the upper run of said second conveying belt for intercepting said cylindrical elements being transported on said second conveying belt and for guiding them, in a row and in a discharge direction, from an intermediate section of the second conveying belt to an outlet channel, situated on one side; of the second conveying belt sensor means, connected to said first motor means for detecting the presence of at least one of said cylindrical elements in a prefixed section of said second conveying belt, as well as for deactivating said first motor means, after a first time interval, subsequent to said cylindrical element being detected, and for activating said first motor means, after a second time interval, when no cylindrical elements are detected in said section.

2. The device of claim 1, wherein said intermediate section is transversal with respect to the feeding direction.

3. The device of claim 1, wherein said second time interval is zero.

4. The device of claim 1, wherein the speed reached by said first conveying belt, is higher than the speed of said second conveying belt.

5. The device of claim 1, wherein the speed of said second conveying belt is kept constant.

6. The device of claim 1, wherein the cylindrical elements are bottles.

* * * * *

UNITED STATES PATENT AND TRADEMARK OFFICE
CERTIFICATE OF CORRECTION

PATENT NO. : 7,086,520 B2
APPLICATION NO. : 11/248446
DATED : August 8, 2006
INVENTOR(S) : Giuseppe Monti It is certified that error appears in the above-identified patent and that said Letters Patent is hereby corrected as shown below:

On the cover page, item [75]: the inventor's surname is corrected from "MONTE" to --MONTI--.

Signed and Sealed this

Ninth Day of January, 2007

JON W. DUDAS
*Director of the United States Patent and Trademark Office*